US006390301B1

(12) United States Patent
Nagaraj et al.

(10) Patent No.: US 6,390,301 B1
(45) Date of Patent: May 21, 2002

(54) PROCESS FOR REMOVING IMPURITIES FROM KAOLIN CLAYS

(75) Inventors: D. R. Nagaraj, Stamford; Roderick G. Ryles, Milford; Alan S. Rothenberg, Wilton, all of CT (US)

(73) Assignee: Cytec Industries Inc., Stamford, CT (US)

( * ) Notice: Subject to any disclaimer, the term of this patent is extended or adjusted under 35 U.S.C. 154(b) by 5 days.

(21) Appl. No.: 09/618,463

(22) Filed: Jul. 18, 2000

Related U.S. Application Data

(63) Continuation of application No. 09/049,761, filed on Mar. 27, 1998, now abandoned.

(51) Int. Cl.$^7$ ................................................. B03B 1/00
(52) U.S. Cl. ................................ 209/5; 209/3; 423/23; 423/69; 423/155; 210/723
(58) Field of Search ....................... 209/3, 4, 5; 423/23, 423/69, 155; 210/723, 725, 736

(56) References Cited

U.S. PATENT DOCUMENTS

| | | | |
|---|---|---|---|
| 3,138,550 A | 6/1964 | Wollery | 209/5 |
| 3,371,998 A | 3/1968 | Maynard et al. | 23/110 |
| 3,450,257 A | 6/1969 | Cundy | 209/5 |
| 3,701,417 A | 10/1972 | Mercade | 209/5 |
| 3,837,482 A | 9/1974 | Sheridan, III | 209/5 |
| 3,862,027 A | 1/1975 | Mercade | 209/5 |
| 4,492,628 A | 1/1985 | Young et al. | 209/5 |
| 4,604,369 A | 8/1986 | Shi | 501/148 |
| 4,629,556 A | 12/1986 | Yoon et al. | 209/166 |
| 4,871,466 A | 10/1989 | Wang et al. | 252/61 |
| 4,931,190 A | 6/1990 | Laros | 209/5 |
| 5,051,199 A | 9/1991 | Barwise | 209/5 |
| 5,180,511 A | 1/1993 | Harrison | 252/61 |
| 5,223,463 A | 6/1993 | Bilimoria | 501/146 |
| 5,449,464 A | 9/1995 | El-Shall | 209/5 |
| 5,520,820 A | 5/1996 | Moody et al. | 209/5 |
| 5,522,986 A | 6/1996 | Shi et al. | 209/166 |
| 5,535,890 A | 7/1996 | Behl et al. | 209/5 |
| 5,584,394 A | 12/1996 | Behl et al. | 209/5 |
| 5,603,411 A | 2/1997 | Williams et al. | 209/5 |
| 5,685,899 A | 11/1997 | Norris et al. | 106/487 |
| 5,891,326 A | 4/1999 | Shi et al. | 209/166 |
| 5,922,207 A | 7/1999 | Willis et al. | 210/710 |
| 5,938,833 A | 8/1999 | Willis et al. | 106/487 |
| 5,951,955 A | 9/1999 | Flieg et al. | 423/121 |
| 6,041,939 A | 3/2000 | Shi et al. | 209/5 |

OTHER PUBLICATIONS

S.A. Ravi Shankar et al., "Selective Flocculation of Iron Oxide–Kaolin Mixtures Using a Modified Polyacrylamide Flocculant", *Bull. Mater Sci.*, vol. 10, No. 5, Aug. 1988, pp. 423–433.

C.R.A. Clauss et al., "Selective Flocculation of Cassiterite in Mixtures with Quartz Using a Modified Polyacrylamide Flocculant", *International Journal of Mineral Processing1*, 3 (1976), pp. 27–34.

E.A. Appleton et al., "Selective Flocculation of Cassiterite", *Journal of the South African Institiute of Mining and Metallurgy*, Oct. 1975, pp. 117–119.

*Primary Examiner*—Tuan N. Nguyen
(74) *Attorney, Agent, or Firm*—Fitzpatrick, Cella, Harper & Scinto

(57) ABSTRACT

A process for the flocculation of impurities from clays in which the following steps are performed: blunging the clay with a dispersing agent or combination of dispersing agents in water to form an aqueous dispersion, treating the aqueous dispersion with at least one aliphatic or aromatic hydroxamic acid or salt conditioning agent, flocculating the conditioned dispersion with a water soluble or water dispersible organic polymer containing hydroxamic acid groups or salts thereof, and removing the flocculated impurities to form a purified clay dispersion.

48 Claims, No Drawings

PROCESS FOR REMOVING IMPURITIES FROM KAOLIN CLAYS

This application is a continuation of U.S. patent application Ser. No. 09/049,761, filed Mar. 27, 1998, now abandoned.

BACKGROUND OF THE INVENTION

1. Field of the Invention

This invention relates to an improved selective flocculation process for the separation of impurities from clay. The selective flocculation process of this invention is particularly useful for separating colored impurities from kaolin clays.

2. Background of the Invention

Crude clays often contain well dispersed mineral impurities that must be removed from the clay prior to use. For example, naturally occurring kaolin clays are contaminated with highly colored impurities composed of iron oxides and titanium oxides (rutile, anatase) and mixtures thereof. Purified kaolin clay is generally white and is suitable for many industrial uses, particularly as a pigment or filler in the paper industry. The technique chosen for the purification of crude clays is often determined by the type of clay (e.g. clays having different particle size distributions and/or different mean particle sizes) and the quantity and identity of the impurities that are to be removed from the clay. The most commonly used purification techniques include chemical bleaching, magnetic separation, froth flotation and selective flocculation. Chemical bleaching is generally used to remove iron impurities, but is not always effective. Chemical bleaching is generally ineffective at removing titanium impurities. Magnetic separation has proven useful for removing titanium impurities from some clays, but it is not useful for purifying clays containing very fine titanium particulates, as found in the ultra-fine kaolin clays mined from the eastern part of Georgia. Froth flotation and selective flocculation processes have proven to be the most useful techniques for the purification of these fine clays. Accordingly, many attempts to improve the efficiency of these processes for producing clays having higher purity have been made.

For example, U.S. Pat. No. 4,629,556 describes a froth flotation process using alkyl, aryl or alkylaryl hydroxamates as collectors for the removal of colored impurities. U.S. Pat. No. 4,871,466 describes a collector composition comprising alkyl or alkaryl hydroxamic acids, or salts thereof, and an aliphatic alcohol for the flotation of colored impurities. U.S. Pat. No. 5,522,986 describes a froth flotation process using a combination of a fatty acid and an alkyl hydroxamate compound, as a collector, to remove impurities in the form of a froth from a coarse grained kaolin clay dispersion. U.S. Pat. No. 3,138,550 discloses another froth flotation process for metallic minerals comprising adding an anionic polymeric flocculating agent to a mineral pulp already conditioned with a fatty acid, as a collector. The success of a froth flotation operation depends on the ability of the collector to effectively bind the impurities and to form a froth. Whereas the froth flotation process is generally effective with coarse grained clays, it has limited effectiveness with very fine clays. For this reason, many non-flotation processes, such as selective flocculation, have been developed as alternatives to flotation.

For example, U.S. Pat. Nos. 3,701,417 and 3,862,027, describe a selective flocculation process using a soluble source of polyvalent cations, specifically calcium chloride, and an anionic organic polyelectrolyte to selectively flocculate and remove impurities from an aqueous kaolin clay dispersion. Other related processes are described in U.S. Pat. Nos. 3,837,482 and 3,371,988. The foremost problem associated with the use of polyvalent cationic reagents is that these reagents bind to clay particles as well as to the impurities. These reagent-bound clay particles flocculate together with the impurities, which results in reduced recovery of the purified clay. It is often difficult to quantitate the amount of polyvalent cationic reagent required to purify a given clay sample without reducing clay recovery. Accordingly, balancing clay purity against clay recovery is a constant problem.

To overcome the problems encountered with the use of polyvalent cationic reagents, monovalent cation conditioning agents, such as ammonium salts, are used in the process described in U.S. Pat. No. 4,604,369. U.S. Pat. No. 3,837,482 describes a reverse flocculation process for purifying clay wherein the clay particles are flocculated, leaving the impurities dispersed in the aqueous suspension. The clay particles are flocculated by addition of an anionic polymeric flocculant. While such a process may be effective, its cost would be very disadvantageous. Instead of selectively flocculating the relatively small amount of impurities, typically 2–4% by weight of crude clay, this process selectively flocculates the clay itself, typically 80–95% by weight of crude clay. Ravishanker et al. (*Bull. Mater. Sci.*, Vol. 10, No. 5, August 1988, pp. 423–433) describe selective flocculation of iron oxide from a 1:1 synthetic mixture of iron oxide and kaolin using hydroxamated polyacrylamide. Clauss et al. (*Intl. J. Miner. Process.*, Vol. 3, 1976, p.27) describe selective flocculation of cassiterite using a modified polyacrylamide flocculant containing hydroxamate functional groups.

U.S. Pat. No. 5,535,890 describes a recent improvement to the selective flocculation process using a conditioning agent composition composed of a water soluble source of polyvalent cations and a fatty acid. Both the polyvalent cation source and the fatty acid are used in quantities insufficient to flocculate the clay particles. Separation of the impurities from clay is accomplished using a highly anionic, high molecular weight copolymer of polyacrylamide and acrylic acid.

Despite the many attempts described above to improve the traditional clay purification processes, there remains a need for a highly efficient, high through-put process that can produce purified clays of varying particle size at low cost.

SUMMARY OF THE INVENTION

This invention is directed to an improved process for the selective flocculation of impurities from clay, particularly, kaolin clay. The process comprises blunging the clay in the presence of dispersing agents, treating the blunged clay with a conditioning agent, or a mixture of conditioning agents, composed of aliphatic or aromatic hydroxamic acids, or salts thereof, flocculating the impurities with a high molecular weight organic polymeric flocculant, and separating the flocculated impurities from the unflocculated clay. The use of hydroxamic acid conditioning agents improves the removal of impurities from the clay, thereby providing a clay product having high brightness and low level impurities. The hydroxamic acid conditioning agents may advantageously be used in combination with other conditioning additives, including alcohols, fatty acids, hydrocarbon oils, and carboxylic acid esters, or with salts containing polyvalent cations. Additionally, the conditioning agents of the present invention are useful with a wide variety of anionic and non-ionic water soluble or water-dispersible polymeric flocculating agents, particularly polymers containing pendant hydroxamate groups. A further embodiment of this invention is the use of a hydroxamate-containing polymeric flocculant to selectively flocculate impurities from clay slurries which have been treated with a fatty acid and a polyvalent metal salt as conditioning agents.

DETAILED DESCRIPTION OF THE INVENTION

The improved process of this invention utilizes selective flocculation of mineral impurities from an aqueous crude clay dispersion using alkyl or aryl hydroxamic acids, or salts thereof, as conditioning agents. This process is particularly useful for selective flocculation of impurities found in ultra-fine kaolin clays, which are not readily purified using conventional techniques, such as froth flotation. The clay dispersion is treated with an alkyl, aryl or aralkyl hydroxamate conditioning agent, or a mixture of hydroxamate conditioning agents, that selectively binds to the mineral impurities commonly found in the crude clays. Flocculation, and subsequent separation of the conditioned clay impurities, is accomplished by addition of high molecular weight organic polymeric flocculating agents. In the prior art, strongly anionic polymeric flocculating agents have been commonly used. It has been found that the use of alkyl, aryl or aralkyl hydroxamate conditioning agents in the process of this invention, advantageously allows for the step of flocculation to be performed using either anionic or non-ionic high molecular weight flocculating agents, and particularly polymeric flocculants containing hydroxamate groups. Furthermore, it has been found that polymers containing hydroxamate groups may be advantageously used when the clay dispersion is treated with fatty acids as conditioning agents. After addition of the flocculating agent to the conditioned dispersion, flocculation of the impurities occurs rapidly to form a two phase mixture having an upper phase containing the purified milky-white clay suspension, and a lower phase containing the impurity-rich flocculated material. Separation of the two layers may be accomplished by any of the techniques conventionally used in flocculation operations.

The process of the present invention is flexible and may be used to effectively purify different types of clays containing a variety of different impurities. With appropriate modifications, which are readily accomplished by those skilled in the art, the present process may be advantageously used to separate a wide variety of minerals from one another. For example, iron oxides may be readily separated from silica or silicates, or cassiterite (tin oxide) may be separated from gangue in ores, ore concentrates or ore pre-concentrates. Significantly, effective removal of impurities may be obtained using the process of the present invention without the use of polyvalent cationic salts, although these salts may be used in conjunction with alkyl hydroxamic acids and other conditioning aids, such as fatty acids, to enhance the purity of the clay.

Use of the selective flocculation process of the present invention provides additional benefits. For example, fine kaolin clays generally contain grit, composed of +325 mesh (U.S. Sieve) particles, which generally must be separated from the crude clay prior to the purification process. This additional separation step may be eliminated using the selective flocculation process of this invention because the grit may simply be removed with the flocculated impurities.

The aqueous clay dispersion is prepared by blunging, or mixing, the clay in water to form a finely dispersed mixture having a milk-like consistency. This clay dispersion is also called a slip. The objective in forming the aqueous clay dispersion is to form a clay composition wherein the crude clay particles are not aggregated with each other, but are uniformly dispersed. The concentration of the dry crude clay in the aqueous clay dispersion is generally about 50% to about 70% by weight of the total weight of the dispersion. In the art, this concentration is described as about 50% "solids" to about 70% "solids".

Advantageously, in the method of this invention, at least one dispersing agent is added during the blunging step, to increase the dispersibility of the clay in water. As used herein, a dispersing agent is a material that is used to impart a highly negative overall charge onto the surface of the clay particles, thereby inducing particle-particle repulsion and preventing particle aggregation. Exemplary dispersing agents that may be useful for preparing a well-dispersed aqueous clay dispersion include sodium silicate, sodium metasilicate, sodium carbonate, sodium or ammonium polyacrylate, hexametaphosphate or the like. Preferred dispersing agents include, for example, sodium silicate, soda ash, and sodium polyacrylate.

The dispersing agent may be added as a solid, or may be pre-dissolved in water and added in an aqueous solution. The amount of dispersing agent used to form a finely dispersed clay mixture will vary from sample to sample and for each type of clay, but is generally in the range of about 0.05 to about 10 kilogram (kg) of the dispersing agent per ton of crude clay (on a dry solids basis) depending on the type of dispersing agent and type of clay crude used. The concentration of the dispersing agent(s) is selected to provide enhanced dispersion of the clay in the clay dispersion which consequently provides enhanced separation of the colored impurities from the clay. Reduction of the viscosity of the dispersed clay dispersion is frequently used as a guide for obtaining a well dispersed clay slip, but ultimately the preferred dispersion is judged by the separation obtained between colored impurities and clay.

Combinations of two or more dispersing agents may be used to improve the formation of the aqueous clay dispersion and the efficiency of the overall purification process. Effective dispersing agent combinations include, for example, soda ash and low molecular weight sodium polyacrylate (molecular weight in the range of 1000–20,000), or sodium silicate and sodium polyacrylate, or a combination of sodium carbonate, sodium silicate and sodium polyacrylate. Preferably, sodium or ammonium polyacrylate are used as one of the dispersing agents. Polyacrylate dispersing agents are commercially available from many suppliers under different trade names, for example, Cyanamer P70® (sodium polyacrylate) sold by Cytec Industries Inc., West Paterson, N.J. When a combination of dispersing agents is used, the agents comprising the combination may be added to the clay dispersion either sequentially or simultaneously. The preferred addition method and the individual use rates for each dispersing agent may be established without undue by experimentation by those skilled in the art. Generally, the use rates for the dispersing agents are in the range of about 1 to about 5 kilograms/ton of clay for sodium silicates, preferably about 2 to about 4 kilograms/ton; in the range of about 0.05 to about 1.0 kilograms/ton for polyacrylates, preferably, about 0.2 to about 0.4 kilograms/ton; and in the range of about 0.25 to about 2.5 kilograms/ton for sodium carbonate, preferably about 0.5 to about 1.5 kilograms/ton. The use rates are dictated by the type of crude clay being treated and the overall separation efficiency between colored impurities and the clay. Statistical experimental designs, such as two- or three-factor, three-level factorial designs, may be useful in determining the use rates, when combinations of dispersing agents are used. See generally, *Statistics for Experimenters*, by Box, Hunter and Hunter, John Wiley & Sons, Inc., 1978.

"Conditioning" of the clay dispersion is a conventional process wherein the clay dispersion is mixed with a conditioning agent to develop dissimilar surfaces between the dispersed clay particles and the impurities, to thereby promote the subsequent separation process. Conditioning is accomplished by treatment of the well-dispersed clay slip with a conditioning agent, or a mixture of conditioning agents, comprising compounds that are N-hydroxy derivatives of amides, or hydroxamic acid derivatives. These compounds are referred to herein as "hydroxamate conditioning agents". The hydroxamate conditioning agent, or a mixture of hydroxamate conditioning agents, used herein are represented by the formula:

$$R-C(=O)N(R'')-OM$$

wherein R is linear or branched $C_2-C_{18}$ alkyl, linear or branched $C_2-C_{18}$ alkenyl, $C_6-C_{20}$ aryl, substituted aryl, $C_7-C_{26}$ aralkyl or substituted aralkyl; R" is H, $C_1-C_{12}$ alkyl or $C_7-C_{26}$ aralkyl; and M is hydrogen, an alkali metal or ammonium ($NH_3$), wherein the substituted aryl or substituted aralkyl are substituted on aryl with hydroxy, $C_1-C_6$ alkoxy, or $C_1-C_6$ alkyl. As used herein, aralkyl represents a moiety comprising an alkyl moiety bonded at either R, R", or both, of $R-C(=O)N(R'')-OM$, wherein the alkyl moiety possesses an aryl, or a substituted aryl substituent. Exemplary aralkyl moieties include benzyl, salicyl, and the like. Preferably, aryl is phenyl or naphthyl. More preferably, the hydroxamate conditioning agents are alkyl hydroxamic acids, or salts thereof, wherein R is linear or branched $C_8-C_{12}$ alkyl, linear or branched $C_8-C_{12}$ alkenyl, aryl or substituted aryl; R" is hydrogen; and M is selected from hydrogen, sodium, potassium or ammonium.

The hydroxamate conditioning agent, or the mixture of hydroxamate conditioning agents, may be added as a solid, a liquid, or as a solution or a dispersion in water. Although the amount of hydroxamate conditioning agent required for purification of a given clay sample will vary depending on the type of clay and the amount of impurities to be removed, the hydroxamate conditioning agents may generally be used in the process of the present invention in an amount of about 250 grams/ton of clay to about 2,000 grams/ton of clay. The hydroxamate conditioning agent, or mixtures thereof, may be used alone or may be optionally used in combination with other conditioning additives. The conditioning treatment described herein comprises treatment of the aqueous clay dispersion with a hydroxamate conditioning agent and a conditioning additive, either simultaneously or sequentially.

Optionally, a conditioning agent composition may be used to condition the clay sample. The conditioning agent composition of this invention is comprised of the hydroxamate conditioning agent, or mixtures thereof, in a combination with at least one conditioning additive selected from an alkyl or aralkyl alcohol, hydrocarbon oil, carboxylic acid ester, or fatty acid represented by the formula:

$$R-C(=O)OM$$

wherein R is a $C_{10}-C_{18}$ alkyl, $C_6-C_{20}$ aryl, substituted aryl, $C_7-C_{26}$ aralkyl or substituted aralkyl, and M is hydrogen, an alkali metal or ammonium ($NH_3$), wherein the substituted aryl or substituted aralkyl are substituted on aryl with hydroxy, $C_1-C_6$ alkoxy, or $C_1-C_6$ alkyl. Preferably, R is $C_{16}-C_{18}$ alkyl, $C_6-C_{20}$ aryl, substituted aryl, $C_7-C_{26}$ aralkyl or substituted aralkyl, and M is hydrogen, an alkali metal or ammonium, wherein the substituted aryl or substituted aralkyl are substituted on aryl with hydroxy, $C_1-C_6$ alkoxy, or $C_1-C_6$ alkyl. Conditioning additives are lipophilic materials that have low water solubility in water that enhance the conditioning of the slurry with the conditioning agent and the subsequent separation process.

Alcohol conditioning additives that may be useful in the process of this invention include long chain branched or linear $C_{10}$ to $C_{22}$ alkyl alcohols, preferably $C_{12}$ to $C_{16}$ alkyl alcohols, or $C_7-C_{26}$ aralkyl alcohols. Preferably, decanol or dodecanol may be used as conditioning additives. Useful hydrocarbon oil conditioning additives are composed of branched or linear $C_{12}$ to $C_{32}$ alkanes or alkenes, preferably $C_{12}$ to $C_{20}$ alkanes or alkenes. Useful carboxylic acid ester conditioning additives comprise branched or linear $C_9$ to $C_{22}$ hydrocarbon moieties, comprising alkanes, alkenes, or aryl moieties. The hydroxamate conditioning agent, or mixtures thereof, may be advantageously pre-dissolved or pre-dispersed in the alkyl alcohol or hydrocarbon oil and added directly to the aqueous clay dispersion. The conditioning additives typically may be used in an amount of about 50% to about 200% by weight, relative to the amount by weight of alkyl hydroxamate conditioning agent.

Useful fatty acid conditioning additives are comprised of $C_{12}-C_{18}$ alkyl, $C_6-C_{20}$ aryl, substituted aryl, $C_7-C_{26}$ aralkyl or substituted aralkyl acids or salts thereof. Preferably, oleic acid is used as a fatty acid conditioning agent. The aqueous clay dispersion may be conditioned with the hydroxamate conditioning agents and the optional fatty acid conditioning additive, sequentially, in any order, or simultaneously. The fatty acid and hydroxamate may be added directly to the aqueous clay dispersion as neat oils, or may be added as a dispersion in water. The fatty acid may be advantageously used in an amount of about 500 grams/ton to about 3,000 grams/ton of crude clay, although that amount may vary depending on the type of clay and the amount of impurities to be removed from the clay.

Optionally, the process of this invention may also include the use of a salt containing a polyvalent metal cation, particularly the alkaline earth metal salts of calcium, magnesium and barium. Incorporation of a polyvalent cationic salt, a critical component in many of the prior art process, is not required for effective purification of clays using the process of this invention, and may be substantially absent. These salts, however, may be optionally added to further improve the overall process. Salts that are useful as conditioning additives are well known, and are generally water soluble salts that may be added directly to the aqueous clay dispersion as a solid or in solution. A preferred polyvalent metal cation containing salt is calcium chloride. The salts may be added simultaneously with, or prior to, the addition of the hydroxamate conditioning agent, or mixtures thereof, in combination with any of the conditioning additives described above. The salt may be added in an amount generally in the range of about 0 grams/ton to about 1,000 grams/ton of crude clay, and preferably at about 250 grams/ton of crude clay, depending on the type of clay and the amount of impurities to be removed from the particular clay sample.

During processing, the clay dispersion, conditioned with hydroxamate and other additives, if any, may be transferred from a blunging/conditioning vessel, such as a mixing tank, or a blender pitcher, to another vessel that would permit subsequent removal of the flocculated impurities, e.g., a settling vessel. The density or % solids of the clay dispersion may be adjusted by addition of water, as necessary, for enhanced flocculation and separation. Typically, the clay concentration in the clay dispersion is reduced such that the clay concentration is in the range of about 10% to about 30% solids, prior to addition of the flocculating agent. Alternatively, the density of the clay dispersion may be adjusted upon addition of the polymer solution. Selective flocculation of the impurities may be accomplished by adding a dilute solution of the polymer, typically, at about 0.01% to about 0.1% by weight, with low shear mixing.

Optionally, the stability of the dispersion and the effectiveness of subsequent impurity separation may be enhanced by the addition of a pH modifying agent. A pH modifying agent is a material having a basic pH (greater than 7.0) that is capable of maintaining the pH of the aqueous clay dispersion in the range of 7.5–10.5, and preferably in the range of 8.0–9.5. Useful pH modifying agents include, without limitations water soluble agents such as ammonia or ammonium hydroxide, sodium or potassium hydroxide and sodium carbonate. The preferred pH modifying agents include, for example, sodium hydroxide or ammonium hydroxide. Optionally, the amount of the pH modifying agent added to the clay dispersion will be that amount necessary to adjust the pH of the aqueous clay dispersion to about 7.5 to about 10.5. The pH modifying agent is commonly added during the blunging step, generally as a solid, but it may be pre-dissolved in water and added as a aqueous solution.

The impurities in the clay dispersion are flocculated (e.g. aggregated and precipitated) from the dispersion by addition of a flocculating agent. The flocculating agent may be added to the conditioned clay dispersion as a dilute water solution. In the process of this invention, useful flocculating agents are high molecular weight organic polymers that are anionic or non-ionic water soluble or water-dispersible organic polymers, having a molecular weight in the range of about 0.5 million to about 30 million, and preferably a molecular weight in the range of about 1.0 million to about 20 million. Examples of useful organic polymeric flocculants include, but are not limited to hydrolyzed polyacrylamides, co-polymers of acrylamide and acrylic acid, copolymers of acrylamide and acrylamidomethylpropanesulfonic acid, vinyl sulfonic acids, carboxymethyl cellulose, polystyrene sulfonic acids, water soluble polymers containing pendant hydroxamic acid functionality, and salts there of, such as hydroxamated polyacrylamides or polyacrylates, water-soluble or dispersible polyethylene oxide polymers, and other non-ionic water soluble or water-dispersible polymers such as polyacrylamides and polyvinyl alcohols. Preferably, the organic polymeric flocculant contains at least one hydroxamic acid moiety, or salts thereof. Preferred polymeric flocculants of this invention are hydroxamated polyacrylamides and hydroxamated polyacrylates.

An additional feature of this invention is that hydroxamated polyacrylamides and hydroxamated polyacrylates may be used to selectively flocculate impurities from clays that have been treated with conditioning agents comprising fatty acids and alkaline earth metal salts. This process comprises the steps of forming an aqueous clay dispersion by blunging the clay with a dispersing agent, or a combination of dispersing agents, in water; treating the aqueous clay dispersion with a conditioning agent represented by the formula:

R—C(=O)OM wherein R is $C_{10}$–$C_{18}$ alkyl, $C_6$–$C_{20}$ aryl, substituted aryl, $C_7$–$C_{26}$ aralkyl or substituted aralkyl, and M is hydrogen, an alkali metal or ammonium, wherein the substituted aryl or substituted aralkyl are substituted on aryl with hydroxy, $C_1$–$C_{26}$ alkoxy, or $C_1$–$C_6$ alkyl; flocculating the conditioned clay dispersion by treatment with a water soluble or water dispersible organic polymer containing hydroxamic acid groups or salts thereof, and removing the flocculated impurities to form a purified clay dispersion. The amount of polymeric flocculant used to purify a clay sample will vary depending upon the type of clay used and the amount of impurity to be flocculated from the particular clay sample. However, the general use rates of the polymeric flocculant in the process of the present invention are in the range of about 20 grams/ton to about 200 grams/ton of crude clay. Advantageously, the aqueous clay dispersion may be also treated with a salt containing a polyvalent metal cation. Preferably, the salt is calcium chloride. Optionally, the clay dispersion is also treated with at least one conditioning additive selected from an aliphatic alcohol, a hydrocarbon oil or a carboxylic acid ester. Preferably, the conditioning additive may be decanol or dodecanol. Useful dispersing agents include sodium silicate, sodium polyacrylate, or sodium carbonate.

Rapid flocculation of the colored impurities in the aqueous clay dispersion generally occurs upon addition of the polymeric flocculating agent. The flocculated impurities settle to form a highly colored lower layer, leaving a milky-white upper layer of purified clay.

This upper clay layer may be isolated from the lower impurity-containing layer by any of the conventional processes used in selective flocculation operations which are well known to those skilled in the art. The upper layer may be decanted away from the lower layer, or alternatively, the lower layer may be drained off from the bottom. Other apparatus, such as a drag box or a low shear centrifugal device, may also be used to separate the lower impurity-containing layer from the purified upper clay layer.

The purified clay produced by the process of this invention possesses high brightness and low levels of impurities. The purity of this product may be further improved by using the conventional techniques of magnetic separation or chemical bleaching.

The Examples which follow are intended as an illustration of certain preferred embodiments of the invention, and no limitation of the invention is implied. All quantities are reported on a dry weight basis unless otherwise indicated. The crude kaolin clay used in these Examples was obtained from a mine in the eastern part of Georgia, USA, having a titanium oxide concentration of about 3.0% by weight. The crude clay possessed a particle size distribution of 80–90% finer than 2 microns.

EXAMPLE 1

A 60% solids dispersion of kaolin clay was prepared by blunging (mixing) 386 g. of the crude clay (approximately 330 g. of clay on a dry weight basis) containing 3.0%. $TiO_2$ with 500 grams/ton sodium carbonate, 3000 grams/ton sodium metasilicate, 250 grams/ton of sodium polyacrylate, and 400 grams/ton of sodium hydroxide (to obtain a blunged slurry having a pH of approximately 8.5–9) in water for 5 minutes using a Waring laboratory blender at high speed. At the end of blunging, 1200 grams/ton of Aero 6493® (a mixture of alkyl hydroxamates, sold by Cytec Industries Inc., West Paterson, N.J.), a conditioning agent, was added to the clay slurry, and the resulting mixture was mixed, or conditioned, in the blender at high speed, for 5 minutes. The conditioned slurry was then divided into three equal portions, each of which was transferred to a 500 ml graduated cylinder. A different selective flocculation polymer was added to each cylinder, at a use rate of 30 grams/ton, to induce flocculation. After addition of a dilute solution (0.01 or 0.03% by weight) of the flocculation polymer, the concentration of the clay in the dispersion was reduced to about 20% by weight by addition of water. The clay slurry was mixed gently using a stainless steel plunger with holes, typically used in flocculation tests. The mixture was allowed to stand for 30 min. during which time the physical attributes of the selective flocculation process, such as floc formation, the appearance of flocs, and the rate of settling, were observed. The volumes of settled and suspended phases were noted, and samples from each phase were analyzed for Ti content, using x-ray fluorescence (see Table 1).

Comparative tests were performed using the procedure described above, but without addition of any conditioning agent(s) prior to flocculant addition. The prior art selective flocculation process was conducted using oleic acid as a fatty acid at 2500 grams/ton in combination with calcium chloride at 385 grams/ton. The dispersing agents used in this test were 2600 grams/ton of sodium metasilicate and 300 grams/ton of sodium polyacrylate.

TABLE 1

| Conditioning | % TiO$_2$ in Clay | | |
| --- | --- | --- | --- |
| | Test Flocculation Agents | | |
| Agents | Agent A* | Agent B* | Agent C* |
| None (Control) | 2.01 | 2.11 | 2.13 |
| Fatty Acid + CaCl$_2$ (Prior art) | 1.00 | — | — |
| Aero 6493 ® | 0.73 | 0.76 | 0.75 |
| Fatty Acid + CaCl$_2$ | — | — | 1.06 |

*Flocculation Agent A: 95% acrylic acid, 5% acrylamide; molecular weight >10 million.
*Flocculation Agent B: Hydroxamated polyacrylamide, 8% hydroxamate functionality, 72% acrylate functionality; molecular weight >10 million.
*Flocculation Agent C: Hydroxamated polyacrylamide, 18% hydroxamate functionality, 62% acrylate functionality; molecular weight >10 million.

In the control test with no conditioning agent the TiO$_2$ content in the clay product is reduced from about 3% by weight in the crude clay to about 2.1% by weight, i.e. a reduction of 0.9%. Use of alkyl hydroxamic acid as the conditioning agent, reduced the TiO$_2$ content in the clay product by more than 1.3%, relative to the control where no conditioning agent was used, or by about 2.2%, relative to the crude clay. The TiO$_2$ content in the clay product is reduced by about 0.25% relative to the prior art process using fatty acid, CaCl$_2$ and a highly charged, high molecular weight copolymer of acrylic acid and acrylamide.

EXAMPLE 2

A solids dispersion was prepared according to the procedure set forth in Example 1, except that 1000 grams/ton sodium carbonate, 2000 grams/ton of sodium metasilicate, 175 grams/ton of sodium polyacrylate, and only 600 grams/ton of Aero 6493® were blunged with the kaolin clay. The TiO$_2$ concentration of the clay, after selective flocculation follows: 1.17% for Polymer A (use rate 30 grams/ton), 1.02% for Polymer B (6.5 grams/ton), and 1.00% for Polymer C (18 grams/ton).

EXAMPLE 3

A solids dispersion was prepared according to the procedure set forth in Example 1, except that the conditioning agent was a mixture of C$_8$–C$_{10}$ alkyl hydroxamic acids. The reduction in TiO$_2$ concentration in the clay product was substantially similar to that observed for Aero 6493®, as reported in Table 1.

EXAMPLE 4

A solids dispersion was prepared according to the procedure set forth in Example 2, except that a conditioning agent combination, consisting of a mixture of C$_8$–C$_{10}$ alkyl hydroxamic acids (conditioning agent) and a oleic acid (conditioning additive), was used to condition the clay dispersion. The conditioning agent combination was added simultaneously with the calcium chloride to the blunged clay dispersion. The reduction in TiO$_2$ concentration in the clay product was substantially similar to that observed for Aero 6493®, as reported in Table 1.

EXAMPLE 5

A solids dispersion was prepared according to the procedure set forth in Example 3, except that the conditioning agent combination consisted of a mixture of C$_8$–C$_{10}$ alkyl hydroxamic acids (conditioning agent) and a hydrocarbon oil (conditioning additive). The reduction in TiO$_2$ concentration in the clay product was substantially similar to that observed for Aero 6493®, as reported in Table 1.

EXAMPLE 6

A solids dispersion was prepared according to the procedure set forth in Example 3, except that the conditioning agent combination consisted of a mixture of C$_8$–C$_{10}$ alkyl hydroxamic acids (conditioning agent) and methyl palmitate ester oil (conditioning additive). The reduction in TiO$_2$ concentration in the clay product was substantially similar to that observed for Aero 6493®, as reported in Table 1.

EXAMPLE 7

A solids dispersion was prepared according to the procedure set forth in Example 4, except that the conditioning agent combination, consisting of a mixture of C$_8$–C$_{10}$ alkyl hydroxamic acids (conditioning agent) and a oleic acid (conditioning additive), was used in combination with calcium chloride to condition the clay dispersion. The conditioning agent combination was added simultaneously with the calcium chloride to the blunged clay dispersion. The reduction in TiO$_2$ concentration in the clay product was substantially similar to that observed for Aero 6493®, as reported in Table 1.

EXAMPLE 8

A solids dispersion was prepared according to the procedure set forth in Example 1, except that the flocculent was a polyethylene oxide. The reduction in TiO$_2$ concentration in the clay product was substantially similar to that observed for Aero 6493®, as reported in Table 1.

Other variations or modifications, which will be obvious to those skilled in the art, are within the scope and teachings of this invention. This invention is not to be limited except as set forth in the following claims.

We claim:

1. A process for removing colored impurities from kaolin clay comprising the following steps:
   a) blunging the clay with sodium silicate and sodium polyacrylate in water to form an aqueous clay dispersion;
   b) treating the aqueous clay dispersion with a mixture of C$_8$–C$_{10}$ hydroxamic acid and C$_{12}$ alcohol;
   c) flocculating the conditioned clay dispersion by treatment with hydroxamated polyacrylamide of molecular weight of about 0.5 million to about 30 million, to form flocculated impurities; and d) removing the flocculated impurities to form a purified clay dispersion.

2. The process according to claim 1, further comprising blunging the clay with sodium hydroxide or ammonium hydroxide.

3. The process according to claim 1, further comprising treating the aqueous clay dispersion with oleic acid.

4. The process according to claim 1, further comprising treating the aqueous clay dispersion with calcium chloride.

5. A process for removing colored impurities from clay comprising the steps of:

a) blunging the clay with a dispersing agent, or a combination of dispersing agents, in water to form an aqueous clay dispersion;

b) forming a conditioned dispersion by treating the aqueous clay dispersion with a conditioning agent, or a mixture of conditioning agents, represented by the formula:

$$R—C(=O)N(R")—OM$$

wherein R is linear or branched $C_2$–$C_{18}$ alkyl, linear or branched $C_2$–$C_{18}$ alkenyl, $C_6$–$C_{20}$ aryl, substituted aryl, $C_7$–$C_{26}$ aralkyl or substituted aralkyl; R" is H, $C_1$–$C_{12}$ alkyl or aralkyl; and M is hydrogen, an alkali metal or ammonium, wherein the substituted aryl or substituted aralkyl are substituted on aryl with hydroxy, $C_1$–$C_6$ alkoxy, or $C_1$–$C_6$ alkyl, to form a conditioned dispersion;

c) treating the conditioned dispersion with a flocculating agent comprising a water soluble or water dispersible organic polymer containing hydroxamic acid groups or salts thereof, to flocculate the impurities; and d) removing the flocculated impurities to form a purified clay dispersion.

6. The process according to claim 5, wherein the clay is a kaolin clay.

7. The process according to claim 5, wherein the dispersing agent is selected from the group consisting of sodium silicate, sodium polyacrylate, and sodium carbonate.

8. The process according to claim 5, comprising blunging the clay with a dispersing agent, or combination of dispersing agents, and a pH modifying agent, in water.

9. The process according to claim 5, wherein the pH modifying agent is sodium hydroxide or ammonium hydroxide.

10. The process according to claim 5, wherein the conditioning agent is a hydroxamic acid, or salt thereof, or a mixture of hydroxamic acids, or salts thereof, represented by the formula:

$$R—C(=O)N(R")—OM$$

wherein R is an aralkyl moiety selected from the group consisting of (R'-phenyl), (R'-hydroxy-phenyl), (R'-naphthyl), or (R'-hydroxy-naphthyl), wherein R' is linear or branched $C_1$–$C_{12}$ alkyl, or linear or branched $C_2$–$C_{12}$ alkenyl.

11. The process according to claim 5, wherein the conditioning agent is a hydroxamic acid, or salt thereof, or a mixture of hydroxamic acids, or salts thereof, represented by the formula:

$$R—C(=O)NH—OM$$

wherein R is linear or branched $C_8$–$C_{12}$ alkyl or linear, branched $C_8$–$C_{12}$ alkenyl, $C_6$–$C_{20}$ aryl, or substituted aryl, and M is hydrogen, an alkali metal or ammonium, wherein the substituted aryl is substituted with hydroxy, $C_1$–$C_6$ alkoxy, or $C_1$–$C_6$ alkyl.

12. The process according to claim 5, wherein the water soluble or water dispersible organic polymer is an anionic or a non-ionic polymer having a molecular weight in the range of about 0.5 million to about 30 million.

13. The process according to claim 5, wherein the water soluble or water dispersible organic polymer is an anionic or a non-ionic polymer having a molecular weight in the range of about 1 million to about 20 million.

14. The process according to claim 5, wherein the water soluble or water dispersible organic polymer contains at least one hydroxamic acid moiety, or salts thereof.

15. The process according to claim 5, comprising forming a conditioned dispersion by treating the aqueous clay dispersion with a conditioning agent, or a mixture of conditioning agents, and at least one conditioning additive, wherein said conditioning additive is selected from the group consisting of an aliphatic alcohol, a hydrocarbon oil, a carboxylic acid ester, and a fatty acid having the formula:

$$R—C(=O)OM$$

wherein R is a $C_{10}$–$C_{18}$ alkyl, $C_6$–$C_{20}$ aryl, substituted aryl, $C_7$–$C_{26}$ aralkyl or substituted aralkyl, and M is hydrogen, an alkali metal or ammonium, wherein the substituted aryl or substituted aralkyl are substituted on aryl with hydroxy, $C_1$–$C_6$ alkoxy, or $C_1$–$C_6$ alkyl.

16. The process according to claim 15, wherein the aliphatic alcohol is decanol or dodecanol.

17. The process according to claim 5, further comprising the step of treating the aqueous clay dispersion with a salt containing a polyvalent metal cation.

18. The process according to claim 17, wherein the salt is calcium chloride.

19. A process for removing colored impurities from clay comprising the steps of:

a) blunging the clay with a dispersing agent, or a combination of dispersing agents, in water to form an aqueous clay dispersion;

b) treating the aqueous clay dispersion with a conditioning composition comprising at least one conditioning agent and at least one conditioning additive, wherein
(i) the at least one conditioning agent is represented by the formula:

$$R—C(=O)N(R")—OM$$

wherein R is linear or branched $C_2$–$C_{18}$ alkyl, linear or branched $C_2$–$C_{18}$ alkenyl, $C_6$–$C_{20}$ aryl, substituted aryl, $C_7$–$C_{26}$ aralkyl or substituted aralkyl; R" is H, $C_1$–$C_{12}$ alkyl or aralkyl; and M is hydrogen, an alkali metal or ammonium, wherein the substituted aryl or substituted aralkyl are substituted on aryl with hydroxy, $C_1$–$C_6$ alkoxy, or $C_1$–$C_6$ alkyl, to form a conditioned dispersion; and
(ii) the at least one conditioning additive is a fatty acid represented by the formula:

$$R—C(=O)OM$$

wherein R is a $C_{10}$–$C_{18}$ alkyl, $C_6$–$C_{20}$ aryl, substituted aryl, $C_7$–$C_{26}$ aralkyl or substituted aralkyl, and M is hydrogen, an alkali metal or ammonium, wherein the substituted aryl or substituted aralkyl are substituted on aryl with hydroxy, $C_1$–$C_6$ alkoxy, or $C_1$–$C_6$ alkyl, to form a conditioned clay dispersion;

c) flocculating the conditioned clay dispersion by treatment with a flocculating agent comprising a water soluble or water dispersible organic polymer, to form flocculated impurities; and d) removing the flocculated impurities to form a purified clay dispersion.

20. The process according to claim 19, wherein the clay is a kaolin clay.

21. The process according to claim 19, wherein the dispersing agent is selected from the group consisting of sodium silicate, sodium polyacrylate, and sodium carbonate.

22. The process according to claim 19, comprising blunging the clay with a dispersing agent, or combination of dispersing agents, and a pH modifying agent, in water.

23. The process according to claim 19, wherein the pH modifying agent is sodium hydroxide or ammonium hydroxide.

24. The process according to claim 19, wherein the conditioning agent is a hydroxamic acid, or salt thereof, or a mixture of hydroxamic acids, or salts thereof, represented by the formula:

R—C(=O)N(R")—OM wherein R is an aralkyl moiety selected from the group consisting of (R'-phenyl), (R'-hydroxy-phenyl), (R'-naphthyl), or (R'-hydroxy-naphthyl), wherein R' is linear or branched $C_1$–$C_{12}$ alkyl, or linear or branched $C_2$–$C_{12}$ alkenyl.

25. The process according to claim 19, wherein the conditioning agent is a hydroxamic acid, or salt thereof, or a mixture of hydroxamic acids, or salts thereof, represented by the formula:

R—C(=O)NH—OM wherein R is linear or branched $C_8$–$C_{12}$ alkyl or linear, branched $C_8$–$C_{12}$ alkenyl, $C_6$–$C_{20}$ aryl, or substituted aryl, and M is hydrogen, an alkali metal or ammonium, wherein the substituted aryl is substituted with hydroxy, $C_1$–$C_6$ alkoxy, or $C_1$–$C_6$ alkyl.

26. The process according to claim 19, wherein the fatty acid is a compound represented by the formula:

R—C(=O)OM wherein R is a $C_{16}$–$C_{18}$ alkyl, $C_6$–$C_{20}$ aryl, substituted aryl, $C_7$–$C_{26}$ aralkyl or substituted aralkyl, and M is hydrogen, an alkali metal or ammonium, wherein the substituted aryl or substituted aralkyl are substituted on aryl with hydroxy, $C_1$–$C_6$ alkoxy, or $C_1$–$C_6$ alkyl.

27. The process according to claim 19, wherein the fatty acid is oleic acid.

28. The process according to claim 19, comprising treating the aqueous clay dispersion with at least two conditioning additives, wherein the second conditioning additive is selected from the group consisting of an aliphatic alcohol, a hydrocarbon oil and a carboxylic acid ester.

29. The process according to claim 28, wherein the aliphatic alcohol is decanol or dodecanol.

30. The process according to claim 19, further comprising the step of treating the aqueous clay dispersion with a salt containing a polyvalent metal cation.

31. The process according to claim 30, wherein the salt is calcium chloride.

32. The process according to claim 19, wherein the water soluble or water dispersible organic polymer is an anionic or a non-ionic polymer having a molecular weight in the range of about 0.5 million to about 30 million.

33. The process according to claim 19, wherein the water soluble or water dispersible organic polymer is an anionic or a non-ionic polymer having a molecular weight in the range of about 1 million to about 20 million.

34. A The process according to claim 19, wherein the water soluble or water dispersible organic polymer contains at least one hydroxamic acid moiety, or salts thereof.

35. A process for removing colored impurities from clay comprising the steps of:

a) blunging the clay with a dispersing agent, or a combination of dispersing agents, in water to form an aqueous clay dispersion;

b) treating the aqueous clay dispersion with a conditioning agent represented by the formula:

R—C(=O)OM wherein R is $C_{10}$–$C_{18}$ is alkyl, $C_6$–$C_{20}$ aryl, substituted aryl, $C_7$–$C_{26}$ aralkyl or substituted aralkyl, and M is hydrogen, an alkali metal or ammonium, wherein the substituted aryl or substituted aralkyl are substituted on aryl with hydroxy, $C_1$–$C_6$ alkoxy, or $C_1$–$C_6$ alkyl;

c) flocculating the conditioned clay dispersion by treatment with a flocculating agent comprising a water soluble or water dispersible organic polymer containing hydroxamic acid groups or salts thereof, to form flocculated impurities; and d) removing the flocculated impurities to form a purified clay dispersion.

36. The process according to claim 35, wherein the clay is a kaolin clay.

37. The process according to claim 35, wherein the dispersing agent is selected from sodium silicate, sodium polyacrylate, and sodium carbonate.

38. The process according to claim 35, wherein the water soluble or water dispersible flocculant is an organic polymer containing hydroxamic acid groups or salts thereof having a molecular weight in the range of about 0.5 million to about 30 million.

39. The process according to claim 35, wherein the water soluble or water dispersible flocculant is an organic polymer containing hydroxamic acid groups or salts thereof having a molecular weight in the range of about 1 million to about 20 million.

40. The process according to claim 35, further comprising treating the clay dispersion with at least one conditioning additive selected from the group consisting of an aliphatic alcohol, a hydrocarbon oil and a carboxylic acid ester.

41. The process according to claim 40, wherein the additive is decanol or dodecanol.

42. The process according to claim 35, further comprising the step of treating the aqueous clay dispersion with a salt containing a polyvalent metal cation.

43. The process according to claim 35, wherein the salt containing a polyvalent metal cation is calcium chloride.

44. A process for removing colored impurities from clay comprising the following steps:

a) blunging the clay with sodium silicate and sodium polyacrylate in water to form an aqueous clay dispersion;

b) treating the aqueous clay dispersion with a conditioning agent represented by the formula:

R—C(=O)OM wherein R is $C_{10}$–$C_{18}$ alkyl, $C_6$–$C_{20}$ aryl, substituted aryl, $C_7$–$C_{26}$ aralkyl or substituted aralkyl, and M is hydrogen, an alkali metal or ammonium, wherein the substituted aryl or substituted aralkyl are substituted on aryl with hydroxy, $C_1$–$C_6$ alkoxy, or $C_1$–$C_6$ alkyl;

c) flocculating the conditioned clay dispersion by treatment with a water soluble or water dispersible organic polymer containing hydroxamic acid groups or salts thereof to form flocculated impurities; and d) removing the flocculated impurities to form a purified clay dispersion.

45. The process according to claim 44, wherein the conditioning agent further comprises an additive selected from aliphatic alcohol, hydrocarbon oil or a carboxylic acid ester.

46. The process according to claim 45, wherein the additive is decanol or dodecanol.

47. The process according to claim 44, further comprising the step of treating the aqueous clay dispersion with a salt containing a polyvalent metal cation.

48. The process according to claim 47, wherein the salt containing a polyvalent metal cation is calcium chloride.

* * * * *

UNITED STATES PATENT AND TRADEMARK OFFICE
CERTIFICATE OF CORRECTION

PATENT NO.    : 6,390,301 B1
DATED         : May 21, 2002
INVENTOR(S)   : Nagaraj et al.

It is certified that error appears in the above-identified patent and that said Letters Patent is hereby corrected as shown below:

Column 8,
Line 3, "$C_1$-$C_{26}$" should read -- $C_1$-$C_6$ --; and
Line 21, "acid ester" should read -- acid ester oil --.

Signed and Sealed this

Fourteenth Day of January, 2003

JAMES E. ROGAN
*Director of the United States Patent and Trademark Office*